(12) United States Patent
Tincher

(10) Patent No.: US 8,430,366 B2
(45) Date of Patent: Apr. 30, 2013

(54) CLAMPING DEVICE FOR ATTACHMENT TO A HORIZONTAL BEAM

(76) Inventor: Sidney Tincher, Minneapolis, MN (US)

( * ) Notice: Subject to any disclaimer, the term of this patent is extended or adjusted under 35 U.S.C. 154(b) by 0 days.

(21) Appl. No.: 13/158,701

(22) Filed: Jun. 13, 2011

(65) Prior Publication Data

US 2011/0303809 A1 Dec. 15, 2011

Related U.S. Application Data

(60) Provisional application No. 61/353,828, filed on Jun. 11, 2010.

(51) Int. Cl.
*A47B 96/06* (2006.01)
(52) U.S. Cl.
USPC .................. 248/214; 248/228.7; 248/231.81; 248/311.2
(58) Field of Classification Search .................. 248/214, 248/215, 227.4, 228.7, 231.81, 302–304, 248/311.2, 313
See application file for complete search history.

(56) References Cited

U.S. PATENT DOCUMENTS

| 556,337 | A | | 3/1896 | Dawes | |
|---|---|---|---|---|---|
| 660,990 | A | * | 10/1900 | Houghton | 24/546 |
| 873,488 | A | * | 12/1907 | De Beaumont | 211/119.1 |
| 1,554,740 | A | * | 9/1925 | Licht | 248/303 |
| 1,913,527 | A | * | 6/1933 | Venzie | 52/350 |
| 2,052,120 | A | * | 8/1936 | Vaughan | 248/126 |
| 2,279,442 | A | * | 4/1942 | Burns et al. | 248/311.2 |
| 2,607,554 | A | * | 8/1952 | Charipar | 248/312 |
| 2,628,054 | A | | 2/1953 | Fazakerley | |
| D180,676 | S | | 7/1957 | Thorpe | |
| 3,332,653 | A | | 7/1967 | Hoelzel | |
| 3,568,969 | A | | 3/1971 | Boman | |
| 4,131,259 | A | | 12/1978 | Franks | |
| D258,330 | S | | 2/1981 | Bosley | |
| D306,521 | S | | 3/1990 | Kenney | |
| 5,009,380 | A | | 4/1991 | Fee | |
| D337,226 | S | | 7/1993 | Rosenbaum | |
| D352,674 | S | | 11/1994 | Richards | |
| 5,390,443 | A | | 2/1995 | Emalfarb | |
| 5,402,899 | A | | 4/1995 | Ammeson | |
| D367,998 | S | | 3/1996 | Graw | |
| 5,511,754 | A | | 4/1996 | Johannsen | |
| 5,558,236 | A | | 9/1996 | Williams | |
| D375,229 | S | | 11/1996 | DiBella | |
| 5,664,293 | A | * | 9/1997 | Bartoo | 24/3.12 |
| 5,711,502 | A | | 1/1998 | Emalfarb | |
| 5,957,238 | A | | 9/1999 | Curvin, II | |
| 6,065,727 | A | | 5/2000 | Fitzgerald | |

(Continued)

OTHER PUBLICATIONS

"Boing" Cup Holder, Container Store Catalogue p. 35.

*Primary Examiner* — Gwendolyn Baxter
(74) *Attorney, Agent, or Firm* — Fredrikson & Byron, P.A.

(57) ABSTRACT

A clamping structure comprising an elongated rod having a plurality of bends for attaching to a horizontal beam. The clamping structure includes back portions adjacent the back of the beam, lower portions adjacent to the bottom of the beam, one or more top portions adjacent to the top of the beam and extending forward of the beam, and front portions which are angled away from the front of the beam. The clamping structure may be used to temporarily attach a holding element such as a cup holder or hook to the horizontal beam, and the holding element may be attached to the clamping structure or may be made from the same elongated rod as the holding element.

20 Claims, 10 Drawing Sheets

U.S. PATENT DOCUMENTS

| | | | |
|---|---|---|---|
| D487,862 S * | 3/2004 | Tincher | D7/620 |
| 7,140,148 B1 * | 11/2006 | Williams, II | 43/54.1 |
| D554,927 S | 11/2007 | Smith | |
| D560,441 S | 1/2008 | Kacmarynski | |
| D563,709 S | 3/2008 | Snell | |
| D575,091 S | 8/2008 | Katelhut | |
| D583,630 S | 12/2008 | Goodman | |
| D589,873 S | 4/2009 | Banks | |
| 7,669,819 B2 | 3/2010 | Meyers | |
| 7,690,612 B1 | 4/2010 | Branson | |

* cited by examiner

CLAMPING DEVICE FOR ATTACHMENT TO A HORIZONTAL BEAM

PRIORITY CLAIM

The present application claims priority to provisional patent application Ser. No. 61/353,828, entitled CLAMPING DEVICE FOR ATTACHMENT TO A HORIZONTAL BEAM, filed Jun. 11, 2010, which is incorporated herein by reference in its entirety.

BACKGROUND

It is often desirable to attach elements to beams, such as the horizontal beams on boats such as pontoon boats, railings, fences, chair backs, chair arms. For example, it may be desirable to attach a cup holder, hooks, flag holder, pennant holders, or other holding elements to such beams. It is further desirable to attach such elements can be easily attached and removed as desired, without the use of tools and without damaging the beam, and that the attachment be secure, such that it does become disengaged when bumped or when jostled, such as by motion of the thing to which it is attached.

SUMMARY

Embodiments of the invention include clamping structures for attachment to beams, such as beams having an approximately square or rectangular cross section with top, bottom, front and back sides. The clamping structure may be formed from a single elongated rod having a series of bends, such that the bends divide the rod into various portions or sections. The clamping structure includes first and second back portions, first and second outer lower portions, first and second inner lower portions, a lower connecting portion, first and second front portions, and a top portion.

The first and second back portions are configured for placement adjacent to the back side of the beam. Each of the first and second back portions has a top end and a bottom end and is sized to extend from the top to the bottom of the beam.

The first and second outer lower portions are configured for placement adjacent to the bottom of the beam. Each of the first and second bottom portions has a front end and a back end and is sized to extend from the back to the front of the beam. The back end of the first outer lower portion is adjoined to the bottom end of the first back portion and the back end of the second outer lower portion is adjoined to the bottom end of the second back portion.

The first and second inner lower portions are configured for placement adjacent to the bottom of the beam, between the outer lower portions. Each of the first and second inner lower portions has a front end and a back end and is sized to extend to the front of the beam. The lower connecting portion connects the back ends of the first and second inner lower portions.

The first front portion connects the front ends of the first inner and outer lower portions to each other. The second front portion connects the front ends of the second inner and outer lower portions to each other. The front portions are angled upward relative to the inner and outer lower portions, such as at an angle of between about 3 and about 85 degrees relative to these portions. In some embodiments, they are at an angle of between about 5 and 40 degrees, and in still other embodiments, they are at an angle of between about 10 and 30 degrees.

The top portion is configured for placement adjacent to the top of the beam. The back end of the top portion is adjoined to the top end of the first back portion. The front end of the top portion is adjoined to or forms a holding structure. In some embodiments, the top portion is sized to extend beyond the front of the beam.

In some embodiments, the clamping structure may also include a second horizontally oriented back portion having an outer end and an inner end for placement along the edge of the beam wherein the back and top join. The outer end is adjoined to the top end of the second vertically oriented back portion and the inner end forms one end of the elongated rod. Alternatively, the clamping structure may include an angled back portion having an outer end and an inner end. The outer end is adjoined to the top end of the second vertically oriented portion forming an angle of less than 90 degrees and the inner end forms one end of the elongated rod. In some embodiments, it is at an angle of between about 20 and 70 degrees.

In some embodiments, the clamping structure includes a series of bends which divide the rod into portions in a first, second, third and fourth plane. The first and second planes are horizontally oriented and spaced apart with the first plane above the second plane. The third plane is vertically oriented and perpendicular to the first and second planes. The fourth plane is at angled upward relative to the first and second planes, such as an angle of between 3 and 85 degrees relative to these planes. In other embodiments, the fourth plane is an angle of between about 5 and 40 degrees, while in still other embodiments, it is at an angle of between about 10 and 30 degrees. In some embodiments, the fourth plane is at an angle of about 20 degrees above the first and second planes. The portions of the clamping device as described above are located in each of these planes. The first and second back portions are the third plane. The first and second outer lower portions, first and second inner lower portions, and the lower connecting portion are in the second plane. The first and second front portions are in the fourth plane. The top portion is in the first plane, with its back end extending to the third plane and its front end adjoined to or forms a holding structure.

BRIEF DESCRIPTION OF THE FIGURES

The following figures are illustrative of particular embodiments of the present invention and therefore do not limit the scope of the invention. The figures are intended for use in conjunction with the explanations in the following detailed description. Embodiments of the present invention will hereinafter be described in conjunction with the appended photographs, wherein like numerals denote like elements.

DESCRIPTION

Figure 1:
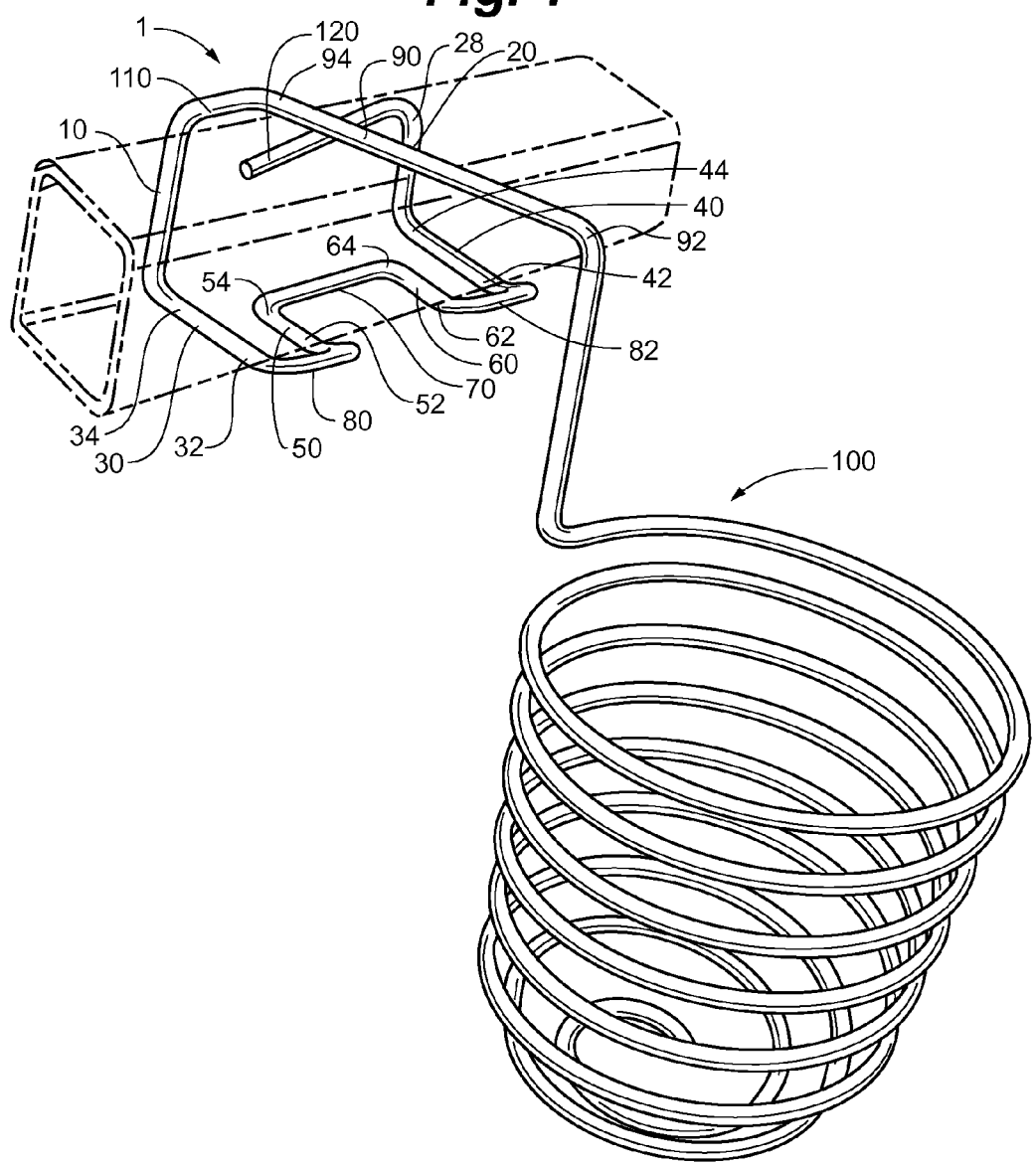
FIG. 1 is a perspective view of a clamp and holding element according to embodiments of the invention.
Figure 2:
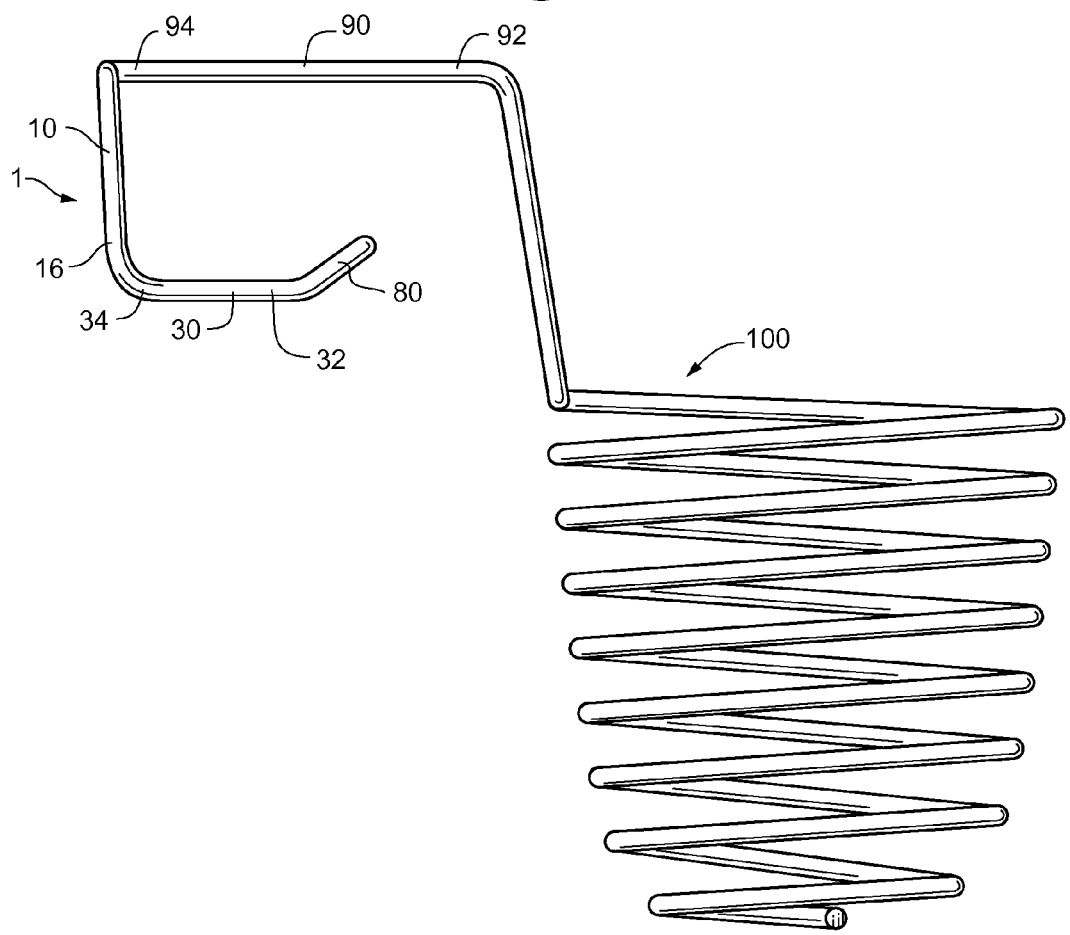
FIG. 2 is a side view of the clamp and holding element of FIG. 1.
Figure 3:
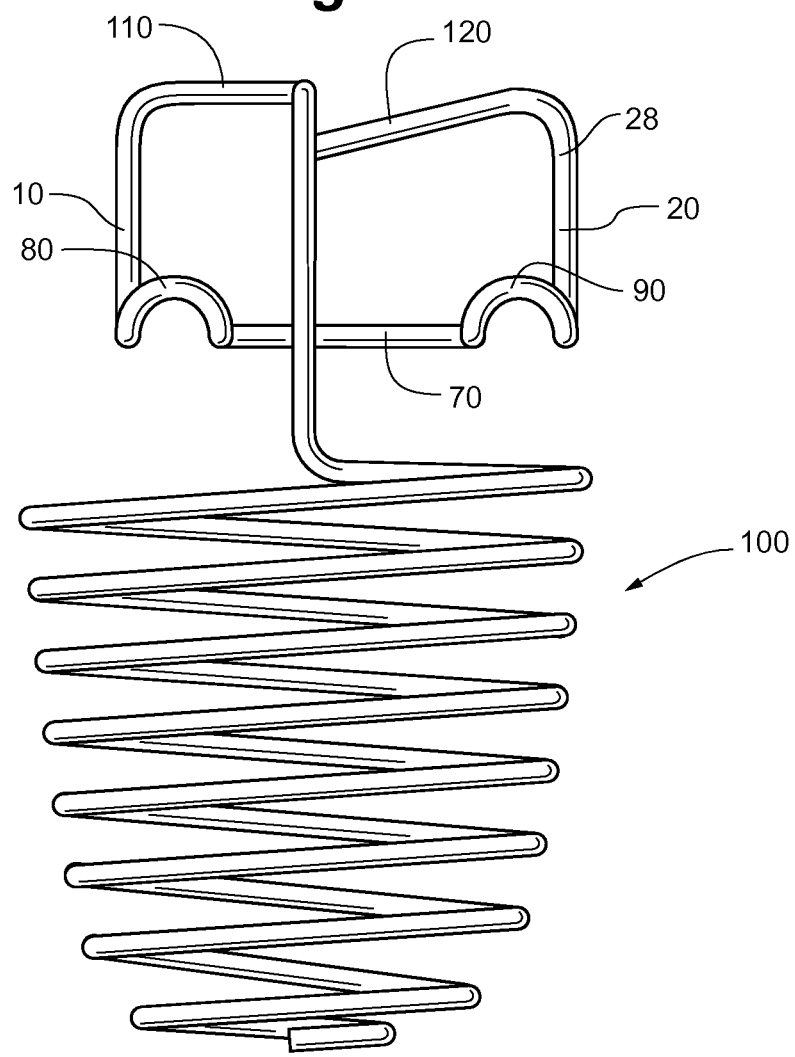
FIG. 3 is front view of the clamp and holding element of FIG. 1.
Figure 4:
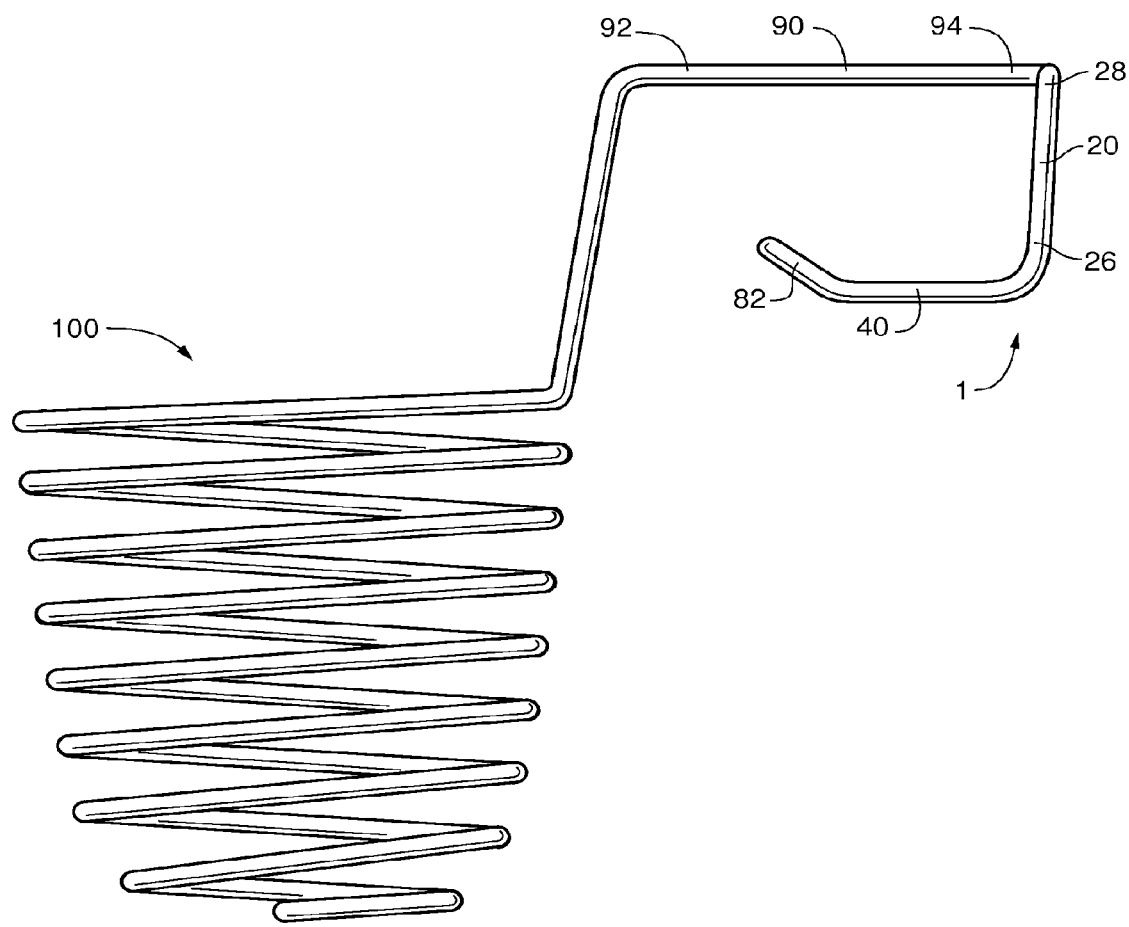
FIG. 4 is a side view of the clamp and holding element of FIG. 1.
Figure 5:
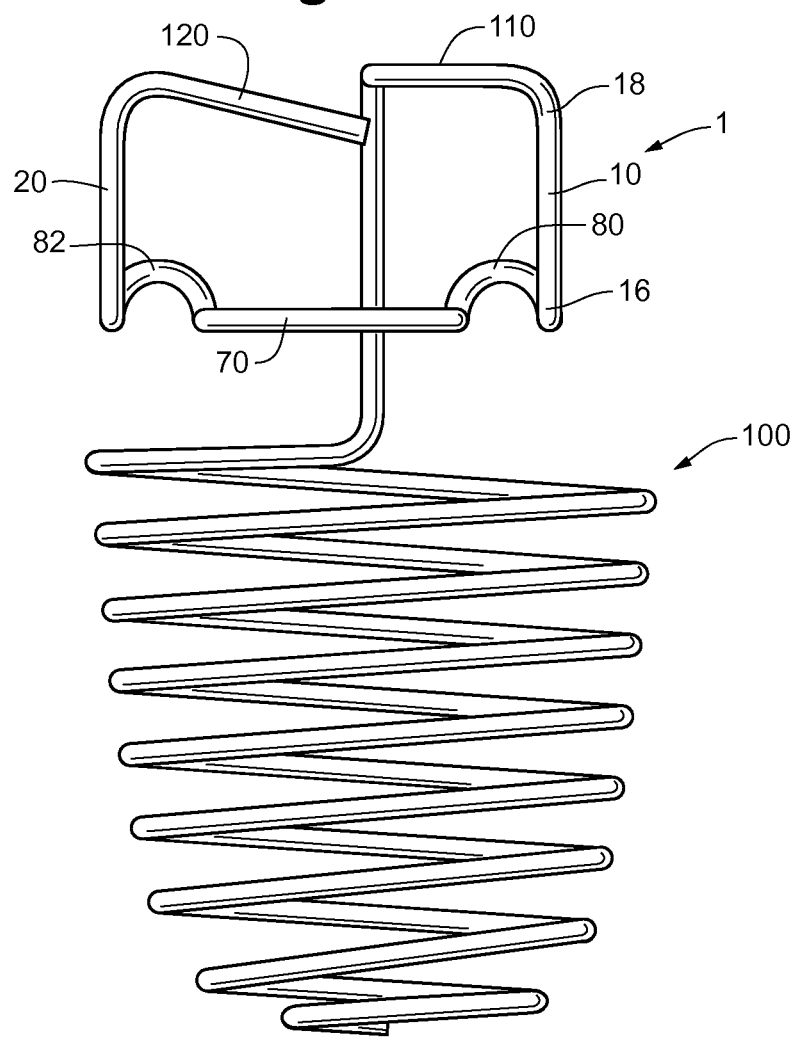
FIG. 5 is a back view of the clamp and holding element of FIG. 1.
Figure 6:
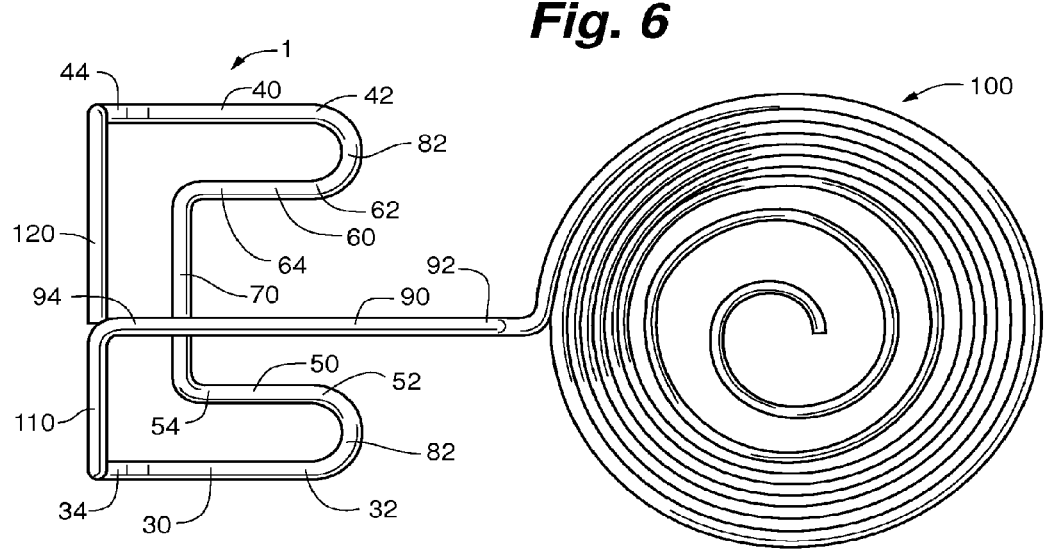
FIG. 6 is a top view of the clamp and holding element of FIG. 1.
Figure 7:
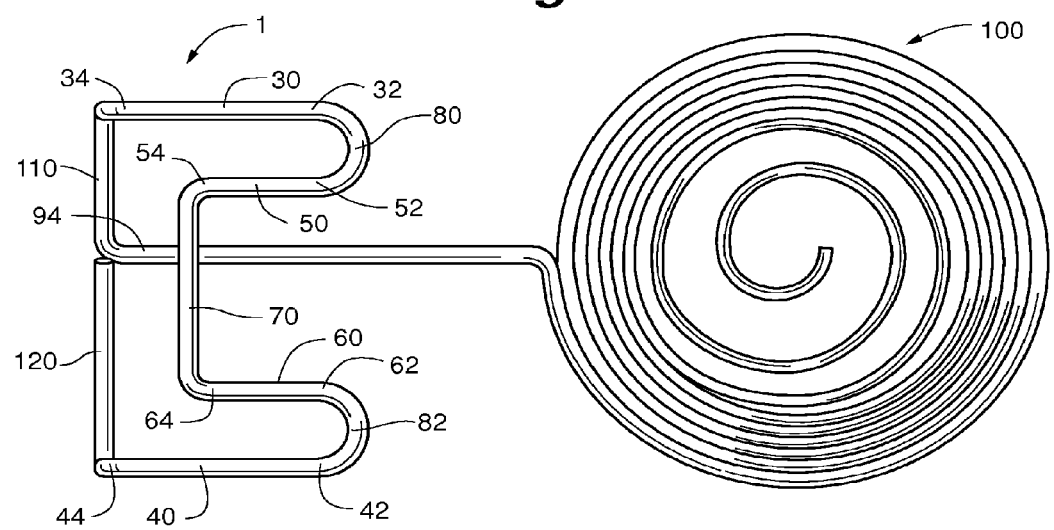
FIG. 7 is a bottom view of the clamp and holding element of FIG. 1.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the invention include clamps or clamp like devices which may be used for attaching various elements such as holding elements to a horizontal beam. Such beams may have an approximately square or rectangular cross-section with four sides including a top, bottom, front and back. In embodiments in which the element being attached to the beam is located on or projects to a side of the beam, the side on which the attached element is located is referred to as the front of the beam and the opposing side is referred to as the back of the beam. The beam also has a top side facing upward and a bottom side facing downward. The horizontal beam may be any elongated beam having a roughly square or rectangular cross-section, regardless of whether the edges of the beam form sharp 90° angles or are rounded. Such beams may be located on boats, such pontoon boats, railings, chair arms or chair backs, fences, decks, canoes, gear storage cases, shelving, or scaffolding.

The clamps according to embodiments of the invention are formed from a single elongated rod having a series of bends which divide the rod into various sections which surround and contact the top, bottom and back of the beam. In some embodiments, the rod also contacts the front of the beam. In other embodiments, the rod includes a front portion which approaches but does not abut the front of the beam, except at the lower front edge of the beam, where the front and bottom sides of the beam meet.

The rod may be formed from any material which may be bent, molded or extruded into a desired shape during manufacture, such that the final product is sufficiently flexible to bend slightly during use and then return to the fabricated shape. The rod may be made from metal such as basic steel, music wire, or spring wire. In some embodiments, the rod may be coated, such as with plastisol, PVC, powder coating, hexavalent plating, trivalent plating, chrome plating, vinyl coating, nylon, or paint which may be applied by any appropriate method such as dipping, spraying, fluidized bed coating, or electrostatic coating. This coating may provide a smoother and more comfortable feel for the user, may result in less scratching of the beam, and may provide higher surface tension when in contact with the surface of the beam. The rod may have a circular cross-section or the cross-section may be square or any other shape.

The bends of the rod divide the rod into multiple portions which lie in various planes, including upper, lower, back and front planes. The upper and lower planes are horizontally oriented, parallel to each other, and spaced apart with the upper plane above the lower plane. The distance between the upper and lower planes is approximately equal to the height of the horizontal beam, from the top to the bottom side of the beam, with which the invention may be used. The back plane is vertically oriented and is perpendicular to the upper and lower planes. The front plane may be at an angle of between 3 and 85 degrees relative to the lower plane. In some embodiments, the font plane is at an angle of between about 5 and 30 degrees, and in still other embodiments, the front plane is at and angle of between about 10 and 20 degrees relative to the lower plane, angling forward and upward from the lower plane. As such, the front plane may be nearly vertical or nearly horizontal, or may be in between. When there is weight in the holding element, that weight will reinforce the grip on the bracket portion. The downward weight in the holding element will pull up on the bottom plane while pushing down on the top plane and help keep the bracket firm and secure on the beam to which it is attached. Where the front and back planes intersect the lower plane, the front and back planes are separated by a distance approximately equal to the depth of the beam, from the front to the backside, with which the invention may be used.

In embodiments of the invention, the rod includes bends which divide the rod into portions which are sized to extend around a horizontal beam of a particular or approximate size. In the embodiment shown in FIG. 1-7, the rod includes a first and second back member 10, 20 in the back plane. Each back member 10, 20 extends from the lower plane to the upper plane. The lower plane includes five lower members including first and second outer lower members 30, 40, first and second inner lower members 50, 60, and a connecting member 70. The first and second inner lower members 50, 60 each have front ends 52, 62 and back ends 54, 64. Likewise the first and second outer lower members 30, 40 each have front ends 32, 42 and back ends 34, 44. The inner lower members 50, 60 are located between the outer lower members 30, 40 and are connected to each other at their back ends 54, 64 by the connecting member 70. The inner lower members 50, 60 in the embodiment shown are parallel to each other, with the connecting member 70 adjoined to them at a right angle. Alternatively, embodiments of the invention may not include a lower connecting member 70. For example, the inner lower members 50, 60 may angle toward each other such that their back ends 54, 64 are directly connected to each other. In such embodiments, the first and second inner lower members 50, 60 may form a V-shape. Alternatively, the inner lower members 50, 60 may curve toward each other as they extend back until they are adjoined at their back ends. In such embodiments, the first and second inner lower members 50, 60 may form a U-shape.

The inner and outer lower members 30, 40, 50, 60 are sized such that the front ends 32, 42, 52, 62 extend to the front plane, at the front of the beam. The front ends 32, 42, 52, 62 of the inner and outer lower members 30, 40, 50, 60 are connected by first and second front members 80, 82 which lie in the front plane, abutting or near the front of the beam. In the embodiment shown in FIGS. 1-7, the front end 32 of the first outer lower member 30 is adjoined to the front end of the first inner lower member 50 by the first front member 80. The front end 42 of the second outer lower member 40 is adjoined to the front end 62 of the second inner lower member 60 by the second front member 82. In the embodiment shown, the first and second front members 80, 82 are U-shaped. In alternative embodiments, they could be V-shaped or could have a squared U-shape. However, in all embodiments, the front members 80, 82 include one or more bends to reverse the direction of the rod, turning it back approximately 180 degrees upon itself, in order to connect the outer lower members 30, 40 to the inner lower members 50, 60.

In the embodiment shown in FIGS. 1-7, the clamp 1, also includes a horizontally oriented top member 90 in the top plane, for placement against the top surface of the beam. The top member 40 is sized to extend from the back side of the beam to beyond the front side of the beam. In the embodiment shown, the top member 90 extends straight in the top plane, perpendicular to the beam and extending forward of/beyond the front side of the beam, to a distance which allows the beam's width to pass between the clamp portion and the holding device 100 before bending downward to form, or connecting to, a holding device 100. In some embodiments, the top member 90 extends straight in the top plane approximately 1.25 inches beyond the front side of the beam to front end 92 and then bends downward to form a holding device 100. In the embodiment shown, the rod forms a downward narrowing spiral which may be used as a cup holder or beverage holder. Alternatively, the rod could be bent into a simple circle, square, hook or any other shape to function as a holding element, or could attach to a separate holding element, such as a basket.

Figure 8:
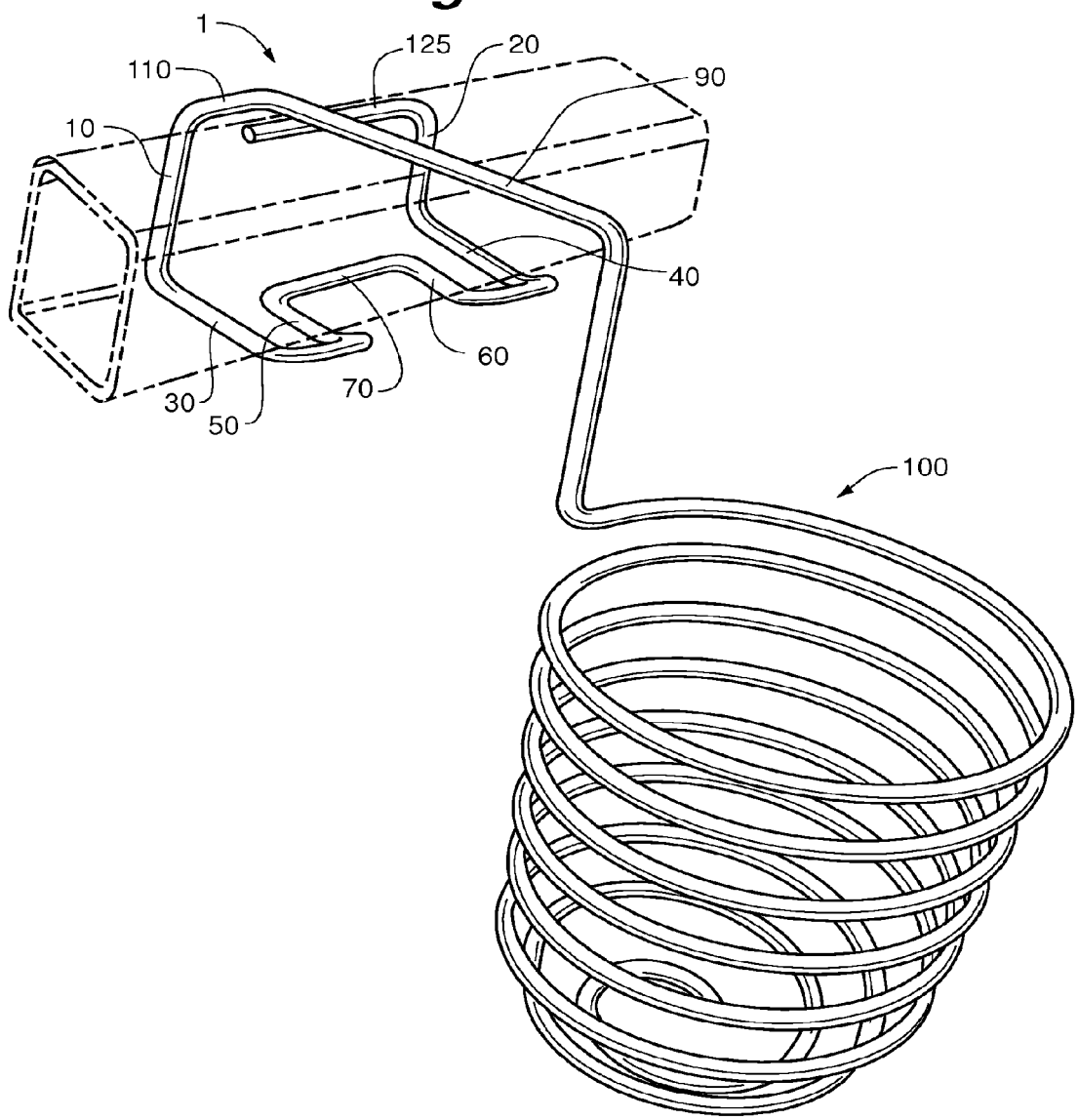
FIG. 8 is a perspective view of a clamp and holding element according to alternative embodiments of the invention.

In the embodiment shown in FIGS. 1-7, the clamp 1 further includes a horizontal back member 110 located approximately at the intersection of the back and top planes, for placement at or near the edge of the beam where the top and back sides meet. This horizontal back member extends from the first vertical back member 10 to the back end 94 of the top member 90, such that the top member 90 is approximately centrally located, above and between the outer lower members 30, 40. The top member 90 (exactly centered between the outer lower members, for example) may be located in the midline of the clamp or may be slightly to one side of midline of the clamp 1. The midline can be considered to be a horizontal plane perpendicular to the back plane and centrally located in the clamp extending midway between the lower members such as the outer lower members 30, 40. In the embodiment shown, the top member 90 is located between the midline and the side of the clamp having the first vertical back member 10. The embodiment shown in FIGS. 1-7 further includes an angled back member 120 in the back plane. This angled back member 120 extends from the top end 28 of the second vertical back member 20, extending downward and at an angle of between approximately 5 and 90 degrees relative to the second back member 20. In the embodiment shown in FIGS. 1-7, the angled back member 120 is at an angle of approximately 60 degrees relative to the second vertical back member 20. In an alternative embodiment shown in FIG. 8, the angled back member 120 is at an angle of 90 degrees relative to the second back member 20 and is located at the intersection of the back and top planes, and may be considered a second horizontal back member 125. The angled back member 120 or the second horizontal back member 125 may form one end of the rod, such that it connects only to the second back member 20.

Figure 9:
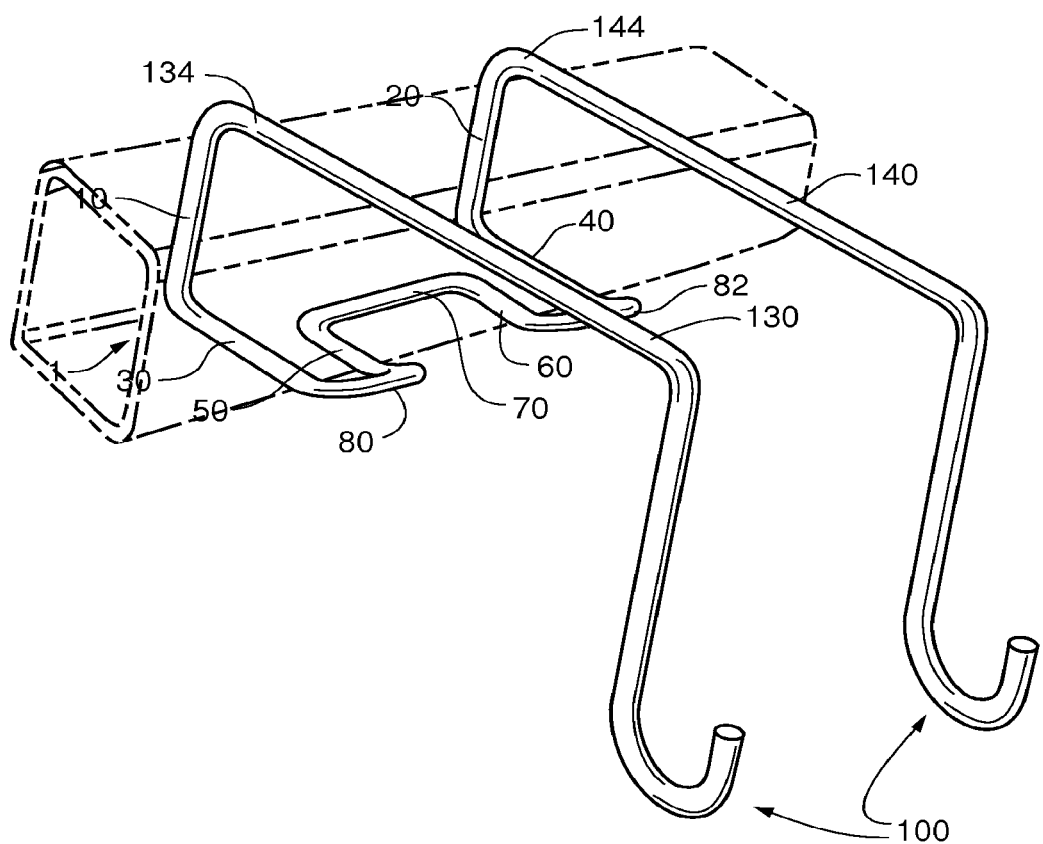
FIG. 9 is a perspective view of a clamp and holding elements according to alternative embodiments of the invention.

In alternative embodiments, the clamp may include a first and a second top member. An example of such an embodiment is shown in FIG. 9. In this embodiment there is a first top member 130 and a second top member 140 extending directly from the vertically oriented first and second back members 10, 20, without a horizontal back member. In this way, the back end 134 of the first top member 130 connects to the top end 18 of the first back member 10. Likewise, the back end 144 of the second top member 140 connects to the top end 28 of the second back member 20. Each top member 130, 140 may extend forward, beyond the front side of the beam, to attach to or form a part of the holding element as shown in FIG. 9. Alternatively, each top member 130, 140 may include bends which bring them together at or near the midline, with one member ending and the other member extending forward to connect to or form a holding element.

In an alternative embodiment (not shown) the lower plane includes only two portions, a first and second lower member. The front plane include first and second front members and a connecting member. The connecting member connects that first and second front member to each other at their top ends, while the bottom ends of the first and second front members connect to the front ends of the first and second lower members. Together, these three front portions form a wide and upside-down squared U shape. As in the other embodiments, the front members in the front plane may be at an angle of between about 3 and 85 degrees relative to the lower members. In some embodiments, they are at an angle of between about 5 and 30 degrees, while in still other embodiments, they are at an angle of between about 10 and 20 degrees.

It should be noted that the use of two separate front portions as shown in FIGS. 1-9 may be preferable to the use of an inverted U-shape. The applicant has discovered that the front portion having an inverted U-shape has a risk of trapping fingers when the clamp is attached to a beam. In contrast, the two separate front portions avoid this risk. Furthermore, the use of two separate front portions provides some amount of flexibility with regard to the beams with which they may be used. For example, the two front portions are better able to accommodate variations in beam size as well as some degree of curvature in the beam.

Embodiments of the invention may be applied to a horizontal beam by first placing the front members of the clamp 1 against the back side of the beam. If the top member or members of the clamp 1 is sized to extend forward of the front side of the beam, then a front portion of the top member or members will rest upon the top of the beam in this position. The front members and/or lower members are then grasped to flex them downward relative to the top member or members, allowing the beam to be slipped into the clamp. The front and/or lower portions are then released, allowing the clamp to encircle and grasp the beam.

Holding elements 100 which may be attached to the horizontal beam using a clamp 1 according to embodiments of the invention include a cup holder or beverage holder, hook, ring, basket, fishing rod holder, for example. These holding elements may be separately formed and attached to the clamp, such as to the top member 90 of the clamp 1. They may be attached by welding, adhesive bonding, or other appropriate means. Alternatively, the holding element 100 may be formed of the same single continuous rod as the clamp 1, extending from the top member 90 of the clamp 1, for example.

Figure 10:
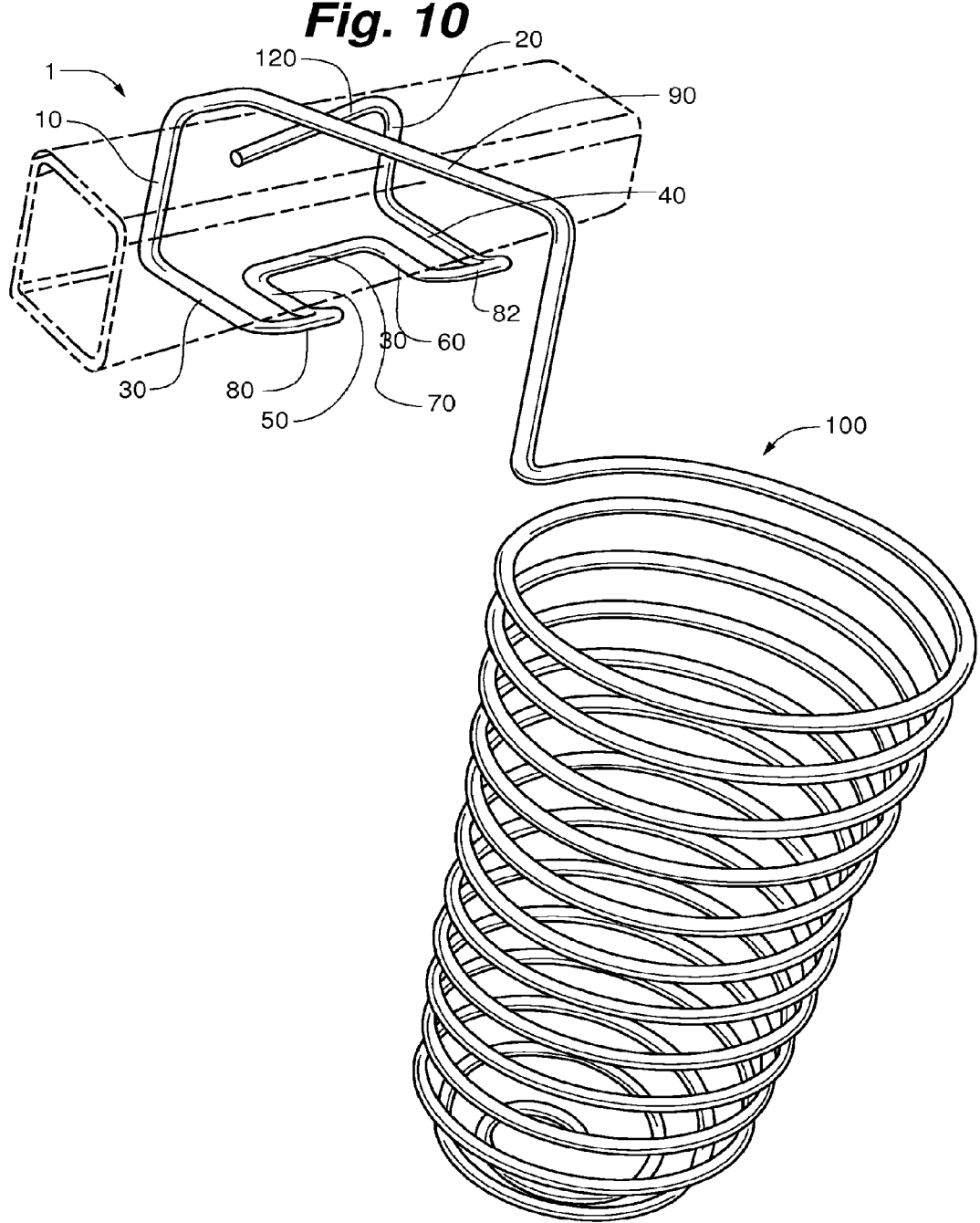
FIG. 10 is a perspective view of a clamp and holding element according to alternative embodiments of the invention.
Figure 11:
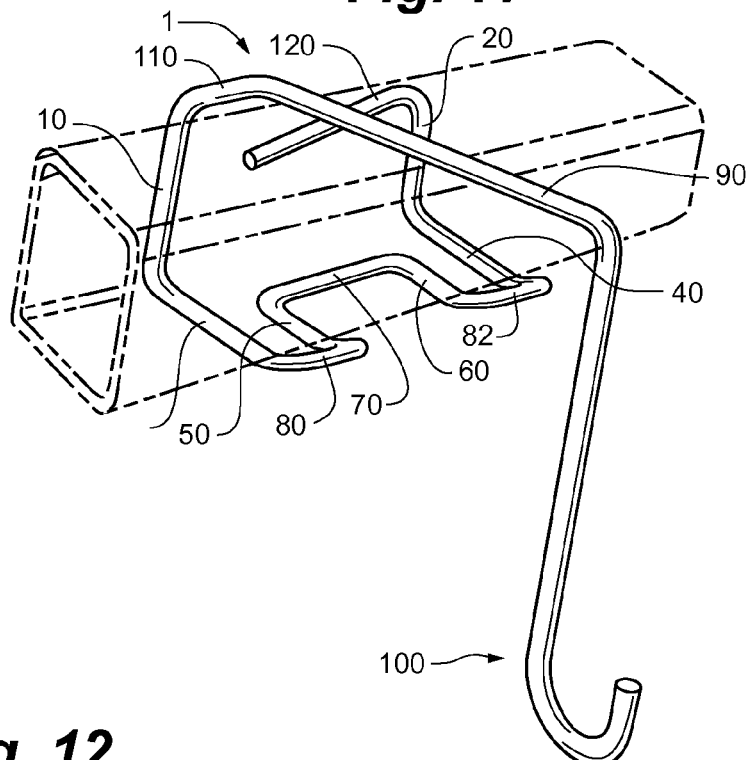
FIG. 11 is a perspective view of a clamp and holding element according to alternative embodiments of the invention.
Figure 12:
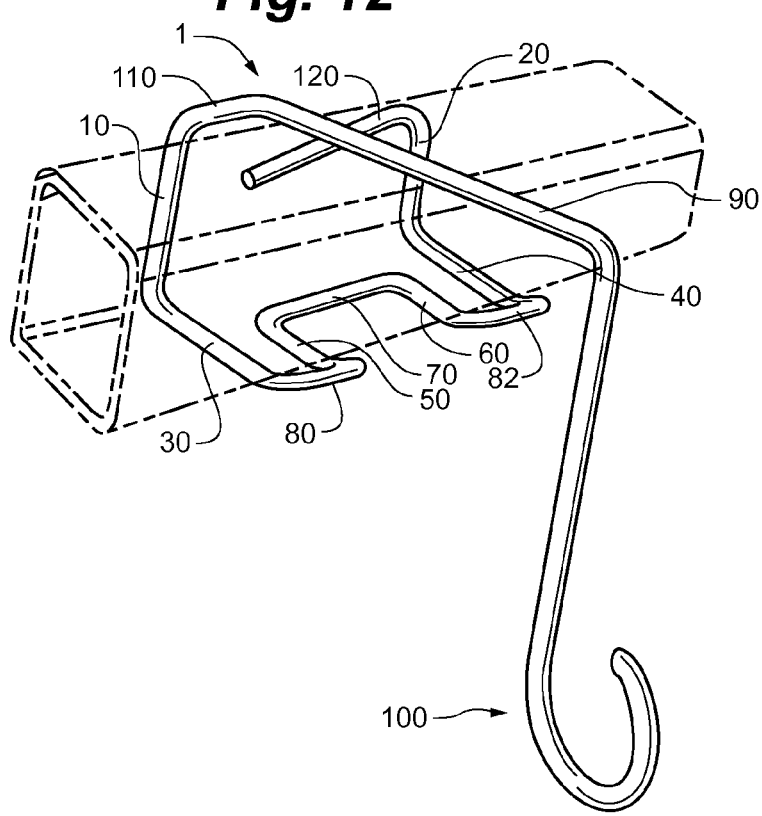
FIG. 12 is a perspective view of a clamp and holding element according to alternative embodiments of the invention.

Examples of alternative holding elements are shown in FIGS. 10-12. In FIG. 10, the rod forms a swirling cone shape that is extended as compared to FIG. 1, and may be used as a bottle holder, for example. In FIGS. 11 and 12, the front end 92 of the top member 90 connects to a hook that extends below the beam. A pair of clamps 1 with hooks such as those of FIGS. 11 and 12 may be used side by side on a beam, with the first hook larger than the second hook. Such embodiments may be useful for holding elongated tapered objects such as fishing poles in a horizontal orientation.

In some embodiments, the holding element 100 is located in front and/or below the beam. For example, the front end 92 of the top portion 90 may bend downward to connect to the holding element 100, which is located in front of the front side and below the bottom side of the beam. In this way, when an item is placed into the holding element, the weight of the holding element is transmitted to the clamp such that the weight distribution enhances product attachment. Alternatively, the holding element 100 could be located above the clamp portion 1, and therefore above the beam with which the clamp 1 is used, such as directly above the clamp 1 or in front of and above the clamp 1.

In the foregoing detailed description, the invention has been described with reference to specific embodiments. However, it may be appreciated that various modifications and changes can be made without departing from the scope of the invention. Thus, some of the features of preferred embodiments described herein are not necessarily included in preferred embodiments of the invention which are intended for alternative uses.

The invention claimed is:

1. A clamping structure for attachment to a beam having an approximately square or rectangular cross section with a top, bottom, front and back, the clamping structure comprising a single elongated rod having a series of bends, the rod comprising:
   first and second back portions for placement adjacent to the back of the beam, each having a top end and a bottom end and sized to extend from the top to the bottom of the beam;
   first and second outer lower portions for placement adjacent to the bottom of the beam, each having a front end and a back end and sized to extend from the back to the front of the beam, the back end of the first outer lower portion adjoined to the bottom end of the first back portion and the back end of the second outer lower portion adjoined to the bottom end of the second back portion;
   first and second inner lower portions, located between the outer lower portions for placement adjacent to the bottom of the beam, each having a front end and a back end and sized to extend to the front of the beam;
   a lower connecting portion connecting the back ends of the first and second inner lower portions;
   first and second front portions, the first front portion connecting the front ends of the first inner and outer lower portions to each other, and the second front portion connecting the front ends of the second inner and outer lower portions to each other, wherein the front portions are angled upward between approximately 3 and 85 degrees relative to the inner and outer lower portions; and
   a first top portion for placement adjacent to the top of the beam and having a back end adjoined to the top end of the first back portion and a front end which is adjoined to or forms a first holding structure.

2. The clamping structure of claim 1 wherein the front end of the first top portion is sized to extend beyond the front of the beam.

3. The clamping structure of claim 1 further comprising a first horizontally oriented back portion extending between the first back portion and the first top portion.

4. The clamping structure of claim 3 wherein the first horizontally oriented back portion has on outer end adjoined to the top end of the first back portion and an inner end adjoined to the back end of the first top portion.

5. The clamping structure of claim 3 further comprising a second horizontally oriented back portion having an outer end adjoined to the second back portion and an inner end forming a first end of the elongated rod.

6. The clamping structure of claim 3 further comprising an angled back portion having an outer end and an inner end, wherein the outer end is adjoined to the top end of the second vertically oriented portion forming an angle of less than 90 degrees and wherein the inner end is a first end of the elongated rod.

7. The clamping structure of claim 3 further comprising a second horizontally oriented back portion having an outer end and an inner end and a second top portion, wherein the outer end of the second horizontally oriented back portion is adjoined to the second back portion and an inner end of the second top portion is adjoined to the second top portion.

8. The clamping structure of claim 7 wherein the second top portion is sized to extend beyond the front of the beam to adjoin to or form a second holding structure.

9. The clamping structure of claim 8 wherein the first holding structure and the second holding structure are hooks.

10. The clamping structure of claim 1 wherein the first and second front portions are U-shaped.

11. The clamping structure of claim 1 wherein the front portions are angled upward between approximately 5 and 30 degrees relative to the inner and outer lower portions.

12. The clamping structure of claim 1 wherein the front portions are angled upward between approximately 10 and 20 degrees relative to the inner and outer lower portions.

13. The clamping structure of claim 1 wherein the elongated rod is made of a metal.

14. The clamping structure of claim 13 wherein the metal is surrounded by a coating.

15. The clamping structure of claim 1 wherein the holding structure is a cup holder.

16. The clamping structure of claim 1 wherein the holding structure is a hook.

17. A clamping structure for attachment to a horizontal beam having an approximately square cross section comprising a single elongated rod having a series of bends dividing the rod into portions in a first, second, third and fourth plane, with the first and second planes being horizontally oriented and spaced apart with the first plane above the second plane, the third plane being vertically oriented and perpendicular to the first and second planes, and the fourth plane being at an angle of between 3 and 85 degrees relative the first and second planes, the rod comprising:
   first and second back portions in the third plane, the first back portion extending from the first to the second plane;
   first and second outer lower portions in the second plane, each extending from the third to the fourth plane, the first outer lower portion connecting to the first back portion and the second outer lower portion connecting to the second back portion;
   first and second inner lower portions in the second plane, located between the outer lower portions, each extending to the fourth plane;
   a lower connecting portion in the second plane, connecting the back ends of the first and second inner portions;
   first and second front portions in the fourth plane, the first front portion connecting the first inner and outer lower portions to each other and the second front portion connecting the second inner and outer lower portions to each other; and
   a top portion in the first plane having a front and back end, wherein the back end extends to the third plane and wherein the front end is adjoined to or forms a holding structure.

18. The clamping structure of claim 17 wherein the rod comprises a coated metal rod.

19. The clamping structure of claim 17 wherein the angle of the fourth plane relative to the first and second planes is between 5 and 30 degrees.

20. The clamping structure of claim 17 wherein the holding element is a cup holder or a hook and wherein the clamping structure and holding element are both formed of a single rod.

\* \* \* \* \*